United States Patent
Singh

(10) Patent No.: US 8,155,367 B2
(45) Date of Patent: Apr. 10, 2012

(54) HAND-HELD, PORTABLE ELECTRONIC DEVICE WITH A RETAINER PORT FOR REMOVABLY COUPLING AN ATTACHABLE WIRELESS AUDIOPHONE THERETO

(76) Inventor: Sanjeev Kumar Singh, Danbury, CT (US)

( * ) Notice: Subject to any disclaimer, the term of this patent is extended or adjusted under 35 U.S.C. 154(b) by 1164 days.

(21) Appl. No.: 11/686,207

(22) Filed: Mar. 14, 2007

(65) Prior Publication Data

US 2008/0125164 A1    May 29, 2008

Related U.S. Application Data

(63) Continuation-in-part of application No. 11/563,429, filed on Nov. 27, 2006.

(51) Int. Cl.
 *H04R 25/00* (2006.01)
 *H04M 1/00* (2006.01)
(52) U.S. Cl. ............ 381/374; 379/433.02; 455/569.1
(58) Field of Classification Search .......... 381/370, 381/374, 376, 311, 334; 455/569.1, 575.2; 379/433.02, 433.03, 433.1, 434
See application file for complete search history.

(56) References Cited

U.S. PATENT DOCUMENTS

| | | | | |
|---|---|---|---|---|
| 5,590,417 A | * | 12/1996 | Rydbeck | 455/575.2 |
| 6,118,882 A | * | 9/2000 | Haynes | 381/374 |
| 6,978,163 B2 | * | 12/2005 | Dyer et al. | 455/575.2 |
| 2005/0059344 A1 | * | 3/2005 | Chang | 455/41.1 |
| 2005/0107131 A1 | * | 5/2005 | Abramov | 455/569.1 |
| 2007/0291973 A1 | * | 12/2007 | Neu et al. | 381/334 |

OTHER PUBLICATIONS

International Search report mailed Aug. 13, 2008 for International Application No. PCT/US2008/056514, 2 pages.
Written Opinion mailed Aug. 13, 2008 for International Application No. PCT/US2008/056514, 5 pages.

* cited by examiner

*Primary Examiner* — Curtis Kuntz
*Assistant Examiner* — Sunita Joshi
(74) *Attorney, Agent, or Firm* — Sanjeev K. Singh

(57) ABSTRACT

A hand-held, portable electronic device is provided with a retainer port for removably coupling an attachable wireless audiophone thereto. By removably coupling the attachable wireless audiophone, the retainer port may detachably retain the attachable wireless audiophone on the hand-held, portable electronic device. The hand-held, portable electronic device may include a first transceiver adapted to communicate with a second transceiver of the attachable wireless audiophone over a wireless communication link. As one example, a cell phone may removably receive a portion of a wireless headset in a retainer port on the cell phone housing for holding and/or in situ charging the wireless headset, such as Bluetooth wireless headset. Both the cell phone and the wireless headset may include a battery, respectively. A shared or common charger may charge the battery of the cell phone and the battery of the wireless headset in situ.

18 Claims, 10 Drawing Sheets

HAND-HELD, PORTABLE ELECTRONIC DEVICE WITH A RETAINER PORT FOR REMOVABLY COUPLING AN ATTACHABLE WIRELESS AUDIOPHONE THERETO

CROSS REFERENCE TO RELATED APPLICATIONS

This application is a continuation-in-part of U.S. patent application Ser. No. 11/563,429, filed on Nov. 27, 2006 and entitled, "RETAINER ON A HAND-HELD, PORTABLE ELECTRONIC DEVICE TO REMOVABLY HOLD AN ATTACHABLE AUDIOPHONE."

BACKGROUND OF THE INVENTION

1. Field of the Invention

This invention relates generally to hand-held, portable electronic devices, and more particularly, to providing an audiophone retainer for headphone(s) and/or microphone using a hand-held, portable electronic device.

2. Description of the Related Art

Increasingly use to hand-held, portable electronic devices, such as a processor or controller based devices including hand-held, portable computers, hand-held multi-media players, music players, cellular phones, hand-held wired and/or wireless communication and/or computing devices, hand-held pocket computers, and personal digital assistants is becoming widely popular. As a result, use and exchange of electronic entertainment content and information is not only a trend anymore but a norm and a convenient way of experiencing multi-media content such as music and video, conveying information including electronic mail messages between users of wired and/or mobile communication devices. Many commercial enterprises, media service providers or network operators, Internet service providers and businesses use Internet to disseminate electronic multi-media content (textual, graphic, music and video files) over a connected mesh of wired and/or wireless network users. For example, several of these entities usually provide access to multi-media content and services on the Internet via websites and web browsers.

Users of the hand-held, portable electronic devices obtain and store a variety of electronic multi-media content such as music and video files on their hand-held, portable devices. Likewise, users of networked devices wired and/or wireless exchange electronic messages to communicate with other users. To use the hand-held, portable electronic devices, an audiophone comprising headphone(s) and/or microphone is provided for users. In general, for listening to electronic multi-media content such as music and video files, a pair of stereo headphones is provided with the hand-held, portable electronic devices. For the hand-held, portable networked, wired and/or wireless communication and/or computing devices, a headphone with a microphone is provided. Examples of headphones and/or microphones include a wired or a wireless set of audio devices.

While the wireless headphones and/or microphones comprise a headphone and/or a microphone, the wired headphone (s) and/or microphone comprise a pair of stereo audio cords with a set of micro headphones at one end and an audio male connector pin on the other end, both face a similar set of issues relating to their storage for reuse, i.e., when not being used by users. In particular, the audio cords are a few feet long so that a user can conveniently use the headphones and/or microphones. Since these audio cords are relatively soft and flexible they get entangled when the headphones and/or microphones are not being used. That is, storage of the headphones and/or microphones with a relatively long and flexible audio cord with headphone speaker(s) attached to its end is a messy affair. With regard to the wireless headphones and/or microphones, because of their wireless convenience it is relatively easy to misplace, damage, or loose them when they are not being in use. In this manner, storage for reuse of both the wired and/or wireless headphones and/or microphones of the hand-held, portable electronic devices becomes quite a challenge when an audiophone is not put to use by users.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one embodiment of the present invention, a retainer port is provided for detachably retaining an attachable wireless audiophone including at least one speaker and a microphone with a hand-held, portable electronic device using a device housing having a surface. The retainer port may comprise a retainer assembly including at least a first portion of the surface of the device housing configured for removably receiving the attachable wireless audiophone on the hand-held, portable electronic device The first portion of the surface of the device housing may securely hold at least a second portion of the attachable wireless audiophone at the hand-held, portable electronic device. The hand-held, portable electronic device may include a first transceiver adapted to communicate with the attachable wireless audiophone over a wireless communication link. The attachable wireless audiophone may include a second transceiver adapted to communicate with the hand-held, portable electronic device using the wireless communication link.

In another embodiment of the present invention, a hand-held, portable electronic device having a device housing with a surface is provided. The hand-held, portable electronic device comprises a retainer port formed in the device housing having the surface to receive a connector of the attachable wireless audiophone for securely holding the attachable wireless audiophone at the hand-held, portable electronic device.

BRIEF DESCRIPTION OF THE DRAWINGS

The invention may be understood by reference to the following description taken in conjunction with the accompanying drawings, in which like reference numerals identify like elements, and in which.

Figure 1:
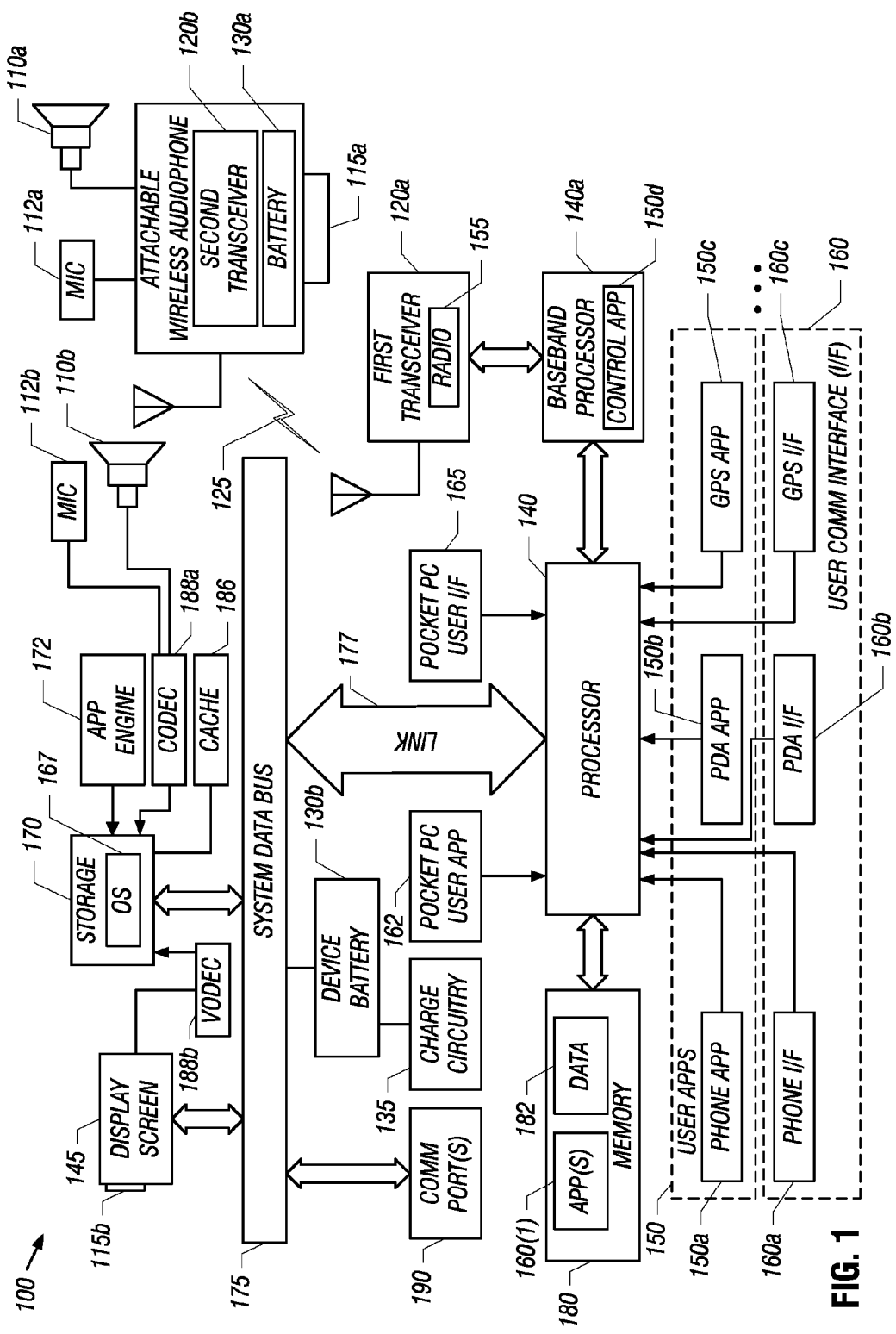
FIG. 1 schematically illustrates a hand-held, portable electronic device including a retainer assembly to detachably retain an attachable wireless audiophone including at least one speaker and a microphone with the hand-held, portable electronic device using a device housing having a surface in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Generally, a method and an apparatus are provided for retaining an attachable wireless audiophone on a hand-held, portable electronic device for storage, reuse and/or in situ charging. For example, a cell phone may comprise a retainer port to receive a connector of a Bluetooth wireless headset to couple it to the cell phone for securely hold the Bluetooth wireless headset therewith. In one embodiment of the present invention, a retainer port may detachably retain an attachable wireless audiophone including at least one speaker and a microphone with a hand-held, portable electronic device using a device housing having a surface. For removably receiving the attachable wireless audiophone on the hand-held, portable electronic device the retainer port may comprise a retainer assembly including at least a first portion of the surface of the device housing configured to securely hold at least a second portion of the attachable wireless audiophone at the hand-held, portable electronic device. The hand-held, portable electronic device may include a first transceiver adapted to communicate with the attachable wireless audiophone over a wireless communication link. The attachable wireless audiophone may include a second transceiver adapted to communicate with the hand-held, portable electronic device using the wireless communication link. In another embodiment of the present invention, a method is provided for providing a retainer assembly to retain an attachable wireless audiophone including at least one speaker and a microphone on a hand-held, portable electronic device having a device housing with a surface. The method comprises forming at least a first portion of the surface of the device housing. The first portion of the surface is configured for removably receiving the attachable wireless audiophone on the hand-held, portable electronic device by securely holding at least a second portion of the attachable wireless audiophone at the hand-held, portable electronic device. The hand-held, portable electronic device includes a first transceiver adapted to communicate with the attachable wireless audiophone over a wireless communication link. The attachable wireless audiophone includes a second transceiver adapted to communicate with the hand-held, portable electronic device using the wireless communication link.

As one example, a cell phone may removably receive a portion of a wireless headset in a retainer port on the cell phone housing for holding and/or in situ charging the wireless headset, such as a Bluetooth wireless headset. Both the cell phone and the wireless headset may include a battery, respectively. A shared or common charger may charge the battery of the cell phone and the battery of the wireless headset in situ. In this way, a retainer port may use a retainer assembly to removably retain an attachable wireless audiophone capable of coupling for communicating with a hand-held, portable electronic device as a pair together for storage, reuse and/or in situ charging. As another example, by using the surface of the housing and/or body of an audio music player, an audiophone retainer assembly may removably store an attachable wireless headset or audiophone along with an audio music player capable of storing and playing MP3 music files. Accordingly, the retainer assembly may enable externally storage of the wireless headset over the surface of the audio music player or cell phone housing and/or internally on the body of the audio music player or cell phone.

Referring to FIG. 1, a hand-held, portable electronic device 100 that may removably retain an attachable wireless audiophone 105 is illustrated according to one embodiment of the present invention. The attachable wireless audiophone 105 may be capable of coupling to the hand-held, portable electronic device 100 and enable communications therewith. The attachable wireless audiophone 105 may include one or more headphone(s). By using a device housing having a surface of the hand-held, portable electronic device 100, in accordance with one embodiment of the present invention, the hand-held, portable electronic device 100 may detachably retain, for example, the attachable wireless audiophone 105.

Examples of the hand-held, portable electronic device 100 include consumer electronics products such as a processor or controller based devices including hand-held, portable computers, hand-held multi-media players, music players, cellular phones, hand-held wired and/or wireless communication and/or computing devices, hand-held pocket computers, and personal digital assistants (PDAs), a game player, a video player, a video recorder, a camera, an image viewer and the like. A hand-held device may be sized for placement into a pocket or hand of the user and no reference surface such as a desktop is desired to operate it. By being hand-held, the hand-held, portable electronic device 100 is relatively small and easily handled and utilized by its user. Unlike a laptop computer, by being portable it is pocket sized; the user may carry the hand-held, portable electronic device 100 in hand and avoid carrying a relatively large bag for a bulky and often heavy device. A battery (not shown), an AC adapter, or a vehicle adapter may power the hand-held, portable electronic device 100. Since the hand-held, portable electronic device 100 is battery operated and highly portable, a user may listen to music, play games or video, record video or take pictures or wirelessly communicate wherever the user travels.

The attachable wireless audiophone 105 may include at least one speaker 110a and a microphone 112a coupled to a connector 115a. The hand-held, portable electronic device 100 may include a connector port 115b to mate with the connector 115a. Examples of the connector 115a and the connector port 115b include a pair of conventional male and female power charging pin and a receptacle or a Universal Serial Bus (USB) plug and play interface between the hand-held, portable electronic device 100 and the attachable wireless audiophone 105. The attachable wireless audiophone 105 may comprise conventional stereo headphones and a conventional speaker phone.

The hand-held, portable electronic device 100 may include a first transceiver 120a adapted to communicate with the attachable wireless audiophone 105 over a wireless communication link 125. The attachable wireless audiophone 105 may include a second transceiver 120b adapted to communicate with the hand-held, portable electronic device 100 using the wireless communication link 125. While the first transceiver 120a may be a cellular communication transceiver, the second transceiver 120b may be a short range wireless transceiver, such as based on Bluetooth protocol. The hand-held, portable electronic device 100 may use the first transceiver 120a for wireless communications. For example, within a cellular transceiver, another short-range Bluetooth transceiver may be provided to communicate with the attachable wireless audiophone 105 and/or a wired or wireless access point. The attachable wireless audiophone 105 may be a headset configured for consumer wearing by a wireless user. The second transceiver 120b of the attachable wireless audiophone 105 may be adapted to communicate with the first transceiver 120a of the hand-held, portable electronic device 100 using a Bluetooth protocol for a short-range wireless communication associated with the wireless user.

Unlike a conventional wireless Bluetooth headset that may need a separate charger to be connected via a port, the attachable wireless audiophone 105 may be charged in situ when the hand-held, portable electronic device 100 is coupled for charging. While the attachable wireless audiophone 105 may comprise a battery 130a, the hand-held, portable electronic device 100 may comprise a device battery 130b and an associated charge circuitry 135. By using the charge circuitry 135 provided for charging the device battery 130b in situ at the hand-held, portable electronic device 100, the battery 130a of the attachable wireless audiophone 105 may be charged in situ from the hand-held, portable electronic device 100 without having to recharge it separately. Alternatively, a separate charging circuit may be provided for in situ charging the battery 130a of the attachable wireless audiophone 105.

In accordance with one embodiment of the present invention, the hand-held, portable electronic device 100 may include a processor 140 that may control the overall operation of the hand-held, portable electronic device 100. The hand-held, portable electronic device 100 may comprise a display screen 145. The processor 140 may be configured to run user applications (APPS) 150 and send outputs of the user applications 150 to the display screen 145. The display screen 145 may provide a touch sensitive screen for display of Operating System prompts, buttons, icons, application screens, and other data, and for providing user inputs via tapping or touching (or drawing in an area) via a stylus or other touch mechanism.

Consistent with the illustrative embodiment of the present invention, the user applications 150 may include a phone application (APP) 150a, a Personal Digital Assistant (PDA) application (APP) 150b, and a Global Positioning System (GPS) application (APP) 150c. The phone application 150a may be configured to capture user inputs for telephone related operations and display current telephone operations information on the display screen 145. The PDA application 150b may be configured to capture user inputs for PDA related operations and display current PDA operations information on the display screen 145. The GPS application 150c may be configured to capture user inputs for location related operations and display current location operations information on the display screen 145.

According to one illustrative embodiment of the present invention, the hand-held, portable electronic device 100 may further include a baseband processor 140a connected to the processor 140 and configured to control operations of a radio device 155 at the first transceiver 120a. The radio device 155 may provide connectivity to a cellular telephone network (not shown). The hand-held, portable electronic device 100 may comprise a user communication (COMM) interface (I/F) 160 that may communicate user inputs and selections to the processor 140 and the baseband processor 140a for the user APPS 150. The user COMM I/F 160 may include a phone interface (I/F) 160a for enabling the phone APP 150a. Likewise, user COMM I/F 160 may include a PDA interface (I/F) 160b for enabling the PDA APP 150b and may further include a GPS interface (I/F) 160c for enabling the GPS APP 150c.

For the purposes of enabling a user of the hand-held, portable electronic device 100 to interact with the hand-held, portable electronic device 100, the user COMM I/F may take a variety of forms including a button(s), keypad, joy stick, touch screen button(s), and dial(s). For example, the user COMM I/F 160 may include physical hard push buttons and switches located on a body of the hand-held, portable electronic device 100 and provide signals to the user applications 150 running on the processor 140 and/or a telephone control application (APP) 150*d* executing on the baseband processor 140*a*.

Consistent with one exemplary embodiment of the present invention, the hand-held, portable electronic device 100 may comprise a handheld or pocket personal computer (PC) application (APP) 162 that includes cell phone technology. The pocket PC APP 162 uses a pocket PC user interface (I/F) 165 for executing computer applications using an operating system (OS) 167 at the hand-held, portable electronic device 100. The hand-held, portable electronic device 100 may comprise storage 170 for storing the operating system 167, data, and the computer applications. The storage 170 may store an application engine 172 to execute the user APPS 150. A user may store a plurality of media items (e.g., songs) in a file system at the storage 170.

The hand-held, portable electronic device 100 may utilize a system data bus 175 to transfer programs and data from the storage 170 to the processor 140, as illustrated by one embodiment of the present invention. Over a link 177, the system data bus 175 may carry data and commands to/from the processor 140 from/to other devices within the hand-held, portable electronic device 100. For example, the user applications 150 running on the hand-held, portable electronic device 100 send application screens and other data outputs to the display screen 145 for display via the system data bus 175. User inputs may be detected by the display screen 145 and sent to the processor 140 on the link 177 via the system data bus 175.

Consistent with one embodiment, the storage 170 may comprise a storage disk or a plurality of disks to provide high capacity storage capability for the hand-held, portable electronic device 100. However, portion of the operating system 167 of the hand-held, portable electronic device 100 may be stored on a non-volatile semiconductor memory device 180 such as FLASH memory. An example of the memory device 180 is a semiconductor memory such as Random-Access Memory (RAM). In the memory device 180, the hand-held, portable electronic device 100 may store executables for executing applications (APPS) 160(1) and associated media content data 182 pertaining to multi-media items in a file system and a cache 186. Examples of the media content data 182 include electronic entertainment content and information such as music, video, electronic mail messages.

The system data bus 175 may internally couple the cache 186, a coder/decoder (CODEC) 188*a*, and a video coder/decoder (VODEC) 188*b* within the hand-held, portable electronic device 100 to the processor 140 for transferring data therebetween. At the hand-held, portable electronic device 100, the CODEC 188*a* may be coupled to the storage 170, which may, in turn, couple a device speaker 110*b* and a device microphone 112*b* to the system data bus 175. The hand-held, portable electronic device 100 may include one or more communication (COMM) port(s) 190 including a Universal Serial Bus (USB) port and a power and/or charging port. Using the COMM port(s) 190, for example, the hand-held, portable electronic device 100 may interface with external devices, such as computers or a base unit.

The hand-held, portable electronic device 100 may interface with computers, commercial enterprises, media service providers or network operators, Internet service providers and businesses using Internet to obtain and/or disseminate electronic multi-media content (textual, graphic, music and video files) over a connected mesh of wired and/or wireless network users. For example, a user of the hand-held, portable electronic device 100 may access multi-media content and services wirelessly or on wired communication medium on the Internet via websites and web browsers.

For illustrative purposes, in one embodiment, the hand-held, portable electronic device 100 may communicate over a communications system that may be a digital cellular network, although it should be understood that the present invention may be applicable to other systems that support data and/or voice communication. The communications system may allow the hand-held, portable electronic device 100 to communicate with a data network, such as the Internet, through one or more base stations (BTS). The hand-held, portable electronic device 100 may take the form of any of a variety of devices capable of accessing the data network through the BTS. In one embodiment, a plurality of the BTSs may be coupled to a Radio Network Controller (RNC) by one or more connections, such as T1/EI lines or circuits, ATM circuits, cables, optical digital subscriber lines (DSL's), and the like. Generally, the RNC operates to control and coordinate the BTSs to which it is connected. The RNC is, in turn, coupled to a controller (CN) via a connection, which may take on any of a variety of forms, such as T1/EI lines or circuits, ATM circuits, cables, optical digital subscriber lines, and the like.

The data network may be a packet-switched data network, such as a data network according to the Internet Protocol (IP). One version of IP is described in Request for Comments (RFC) 791, entitled "Internet Protocol," dated September 1981. Other versions of IP, such as IPv6, or other connection-less, packet-switched standards may also be utilized in further embodiments. A version of IPv6 is described in RFC 2460, entitled "Internet Protocol, Version 6 (IPv6) Specification," dated December 1998. The data network 125 may also include other types of packet-based data networks in further embodiments. Examples of such other packet-based data networks include Asynchronous Transfer Mode (ATM), Frame Relay networks, and the like. As utilized herein, a "data network" may refer to one or more communication networks, channels, links, or paths, and systems or devices (such as routers) used to route data over such networks, channels, links, or paths. It should be understood that the configuration of the communications system may include a network management system (not shown) that provides operation, administration, maintenance, and provisioning functions for a cellular network.

In other embodiments, Bluetooth may enable the hand-held, portable electronic device 100 to communicate over wireless personal area networks (PANs). Bluetooth provides a way to connect and exchange information between devices such as mobile phones, laptops, PCs, printers, digital cameras and video game consoles via a secure, globally unlicensed short-range radio frequency. By using short-range radio frequencies Bluetooth may enable two or more devices, for example, the hand-held, portable electronic device 100 to communicate with another device in close proximity. For example, the audiophone 205 may be a Bluetooth headset capable of transferring files from phones/PDAs to computers. The Bluetooth specification is available from Bluetooth Special Interest Group (SIG) or as IEEE standard 802.15.1. Alternatively, Wi-Fi may be used in the hand-held, portable electronic device 100 to communicate on the same radio frequencies as Bluetooth, but with higher power consumption resulting in a stronger connection. Wi-Fi is sometimes called "Wireless Ethernet". Bluetooth and/or Wi-Fi may be used in the hand-held, portable electronic device 100 within offices, homes and on the move by setting up networks, printing, or transferring presentations and files from PDAs to computers.

In operation, a user of the hand-held, portable electronic device 100 such as a media player may display a list of available media items on the display screen 145 to play a particular media item. By using the user COMM I/O interface 160, a user can select one of the available media items. The processor 140, upon receiving a selection of a particular media item, supplies the media data (e.g., audio file) for the particular media item to the CODEC 188a. The CODEC 188a then produces analog output signals for the speaker 110b. The speaker 110b can be a speaker internal to the hand-held, portable electronic device 100 or external to the hand-held, portable electronic device 100. For example, headphones or earphones that connect to the hand-held, portable electronic device 100 would be considered an external speaker. Accordingly, the processor 140 controls the playing of the particular media item such that upon receiving the user's selection of the particular media item, such as music file in Moving Picture Experts Group (MPEG)-1 Audio Layer 3 (MP3) format or MPEG-4 format based on International Organization for Standardization (ISO)/International Electro-technical Commission (IEC) JTC1/SC29 WG11 standard or M-JPEG used by Internet Protocol (IP) based video cameras via Hypertext Transfer Protocol (HTTP) streams by using multipart and/or mixed content type.

Consistent with one embodiment, the video coder/decoder (VODEC) 188b may be likewise included in the hand-held, portable electronic device 100 to play video items or image files, such as a video file in Windows Media Format (*.wma file) or in a Joint Photographic Experts Group (JPEG) based on JPEG 2000: Image Compression Standards available from International Organization for Standardization (ISO) or MPEG format, or DivX Media Format (*.divx). Another example is a (*.wav), short for Waveform audio format that is a Microsoft and IBM audio file format standard for storing audio on personal computers (PCs). Other examples include the Resource Interchange File Format (RIFF) bit stream format for storing data in "chunks," the Interchange File Format (IFF) and the Audio Interchange File Format (AIFF) format used on Apple Macintosh computers.

Consistent with one embodiment, a set of base stations may provide wireless connectivity to the hand-held, portable electronic device 100 according to a desirable communication protocol. Examples of a communication protocol include a code division multiple access (CDMA, CDMA2000) protocol, wideband-CDMA (WCDMA) protocol, a Universal Mobile Telecommunication System (UMTS) protocol, a Global System for Mobile communications (GSM) protocol, and like. For example, the hand-held, portable electronic device 100 as a smart phone, text messaging device, and the like may employ a spread spectrum cellular system to operate in a high-speed wireless data network, such as a digital cellular CDMA network.

Figure 2:
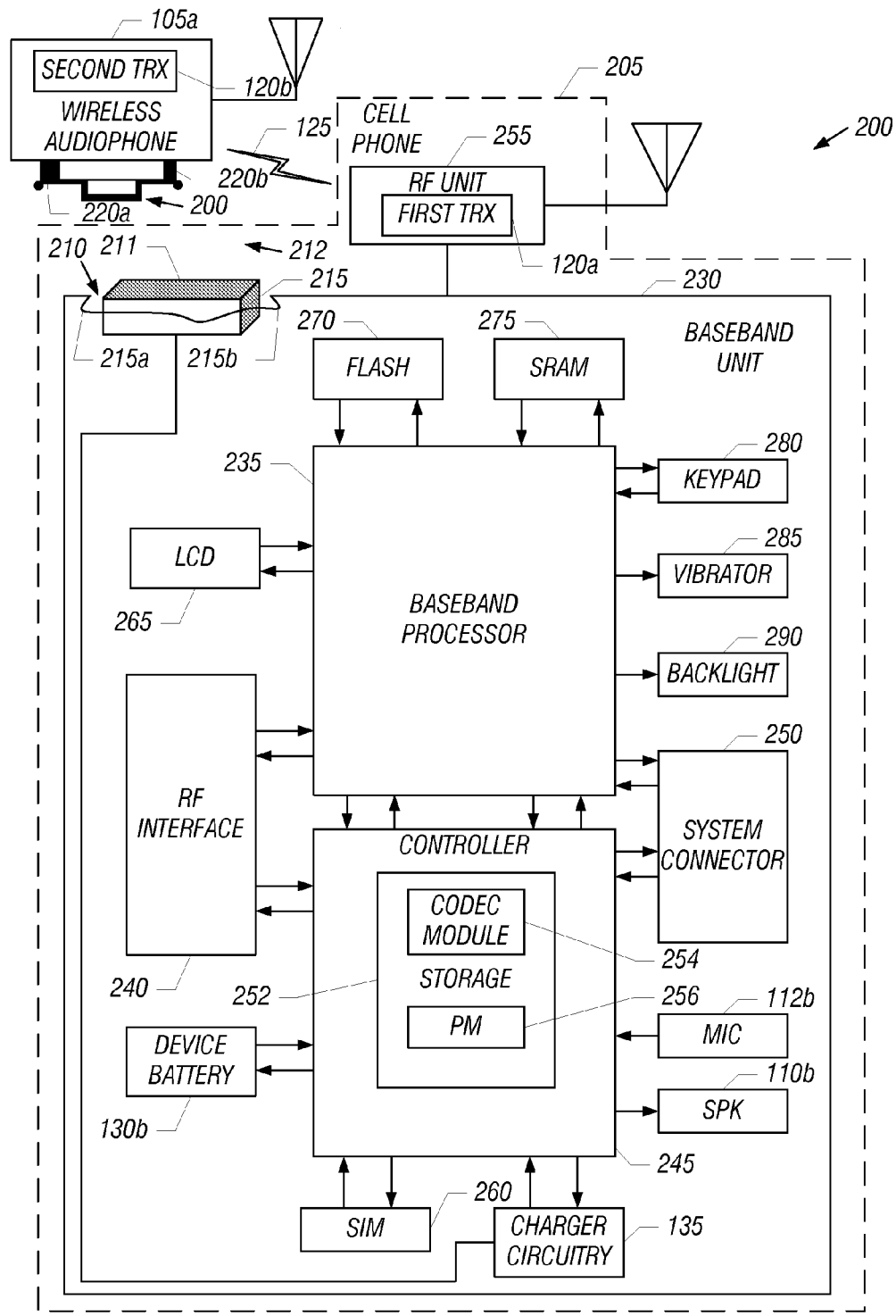
FIG. 2 schematically illustrates a hand-held, portable electronic device with a retainer port including a retainer assembly in accordance with one embodiment of the present invention.

Referring to FIG. 2 a hand-held, portable electronic device, such as a cell phone 200 is schematically illustrated with a retainable wireless audiophone 105a capable of attaching to a cell phone housing 205, in accordance with one embodiment of the present invention. The cell phone housing 205 may removably retain the retainable wireless audiophone 105a capable of wirelessly coupling to communicate with the cell phone 200. The cell phone housing 205 having a surface 210 may removably receive the retainable wireless audiophone 105a for holding together as a mating pair with the cell phone 200.

In one embodiment, the cell phone 200 may comprise a retainer port 211 that uses a retainer assembly 212 to removably couple the retainable wireless audiophone 105a to the cell phone housing 205. The retainer assembly 212 may comprise at least a first portion 215a-215b of the surface 210 of the cell phone housing 205 may be configured for removably receiving retainable wireless audiophone 105a on the cell phone 200. To latch itself with the cell phone housing 205, for providing the retainer assembly 212, the retainable wireless audiophone 105a may comprise at least a second portion 220a-220b. Examples of the first portion 215a-215b of the surface 210 of the cell phone housing include a cavity 215 having a pair of hollow bubbles so shaped to receive a corresponding solid bubble pair, respectively. Examples of the second portion 220a-220b of the retainable wireless audiophone 105a include a plug 220 having a pair of solid bubbles capable of snugly latching to the corresponding hollow bubble shaped to receive a respective solid bubble of the pair of solid bubbles. However, persons of an ordinary skill would appreciate that the retainer assembly 212 may be formed of many known shapes and structures by having the benefit of this instant disclosure based on one or more factors including a desired application and its operation, location on the cell phone 200. For example, an arrangement of the retainer assembly 212 may comprise the plug 220 and cavity 215. This arrangement may use a known stylus and an associated receptacle structure to securely receive and retain the retainable wireless audiophone 105a with the cell phone housing 205 at the cell phone 200 by using a mating wedge or tapered forms for the plug 220 and a hollow cone-shaped or wedge-shaped receptacle for the cavity 215 instead of the bubbles based configuration.

The first portion 215a-215b of the surface 210 of the cell phone housing 205 may securely hold at least the second portion 220a-210b of the retainable wireless audiophone 105a at the cell phone 200. While the cell phone 200 may include the first transceiver (TRX) 120a adapted to communicate with the retainable wireless audiophone 105a over the wireless communication link 125, the retainable wireless audiophone 105a may include the second transceiver (TRX) 120b adapted to communicate with the cell phone 200 using the wireless communication link 125.

Consistent with one embodiment, the cell phone 200 may comprise a conventional radio frequency (RF) unit 225. The RF unit 225 may include the first transceiver (TRX) 120a to communicate with the retainable wireless audiophone 105a over the wireless communication link 125. Examples of the RF unit 225 include a transceiver based on one or more communication protocols including Bluetooth, Wi-Fi, CDMA, WCDMA, GSM, and General Packet Radio Service (GPRS), a packet-based air interface for radio transmission of data, usually between mobile phones and the Internet.

The cell phone 200 may comprise a baseband unit 230 for digital processing the information signal (voice, data, or image) in the frequency range before being modulated onto a carrier or demodulated after reception by using a signaling technique in which the signal is transmitted in its digital form and not changed by modulation techniques. The baseband unit 230 may comprise a baseband processor 235 for use in a communications system, for example, wireless communications systems and, more particularly, toward baseband processing of communication channels. For example, the baseband processor 235 may be suitable in the United States for a wireless phone service offered in both the cellular (approx. 800 Mega Hertz (MHz)) and PCS (Personal Communications Services) (approx. 1900 MHz) frequency bands in a dual-band phone.

When digital speech represented by a series of bits, which are modulated and transmitted from a base station (not shown) to the cell phone 200, and vice versa, the cell phone 200 may demodulate the received waveform to recover the bits as originally transmitted, and the recovered bits are then converted back into speech. The baseband unit 230 may enable data services, such as E-mail, Internet access, etc., that require digital communications.

In operation, the baseband unit 230 may use one or more types of digital communications systems. For example, FDMA (Frequency-Division-Multiple-Access) systems divide the radio spectrum into a plurality of radio channels corresponding to different carrier frequencies. TDMA (Time-Division-Multiple-Access) systems further divide the carrier frequencies into time slots. D-AMPS (Digital Advanced Mobile Phone System), PDC (Pacific Digital Cellular), and GSM (Global System for Mobile communications) are examples of digital TDMA cellular systems. Alternatively, if the radio channel is wide enough, multiple users can use the same channel using spread spectrum techniques and CDMA (Code-Division-Multiple-Access). IS-95 and J-STD-008 are examples of wireless systems incorporating CDMA standards.

The baseband unit 230 may comprise a RF interface 240 to interface with the RF unit 225. The baseband unit 230 may further comprise a controller 245 and a system connector 250. While the system connector 250 may be used to connect any external accessories and/or a battery charger unit (not shown), the controller 245 may comprise a storage device 252 to store a conventional CODEC module 254 and a phone manager (PM) module 256. The CODEC module 254 and the phone manger module 256 may be software and/or firmware that comprise instructions or program code. The CODEC module 254 may control voice functionality of the cell phone 200. The phone manger module 256 may control the device battery 130b, the charger circuitry 135, the speaker (SPK) 110b, and the microphone (Mic) 112b. The phone manger module 256 may control a subscriber identity module (SIM) 260, a smartcard securely storing the key identifying a mobile subscriber. For example, the SIM 260 may be used with a GSM system or with a compatible module it may be used for a UMTS phone and/or an Integrated Digital Enhanced Network (IDEN) phone. The SIM 260 may store text messages and a phone book. The baseband unit 230 may further comprise a liquid crystal display (LCD) 265, FLASH memory 270, static random access memory (SRAM) 275, a keypad 280, a vibrator 285, and a backlight 290.

Figure 3:
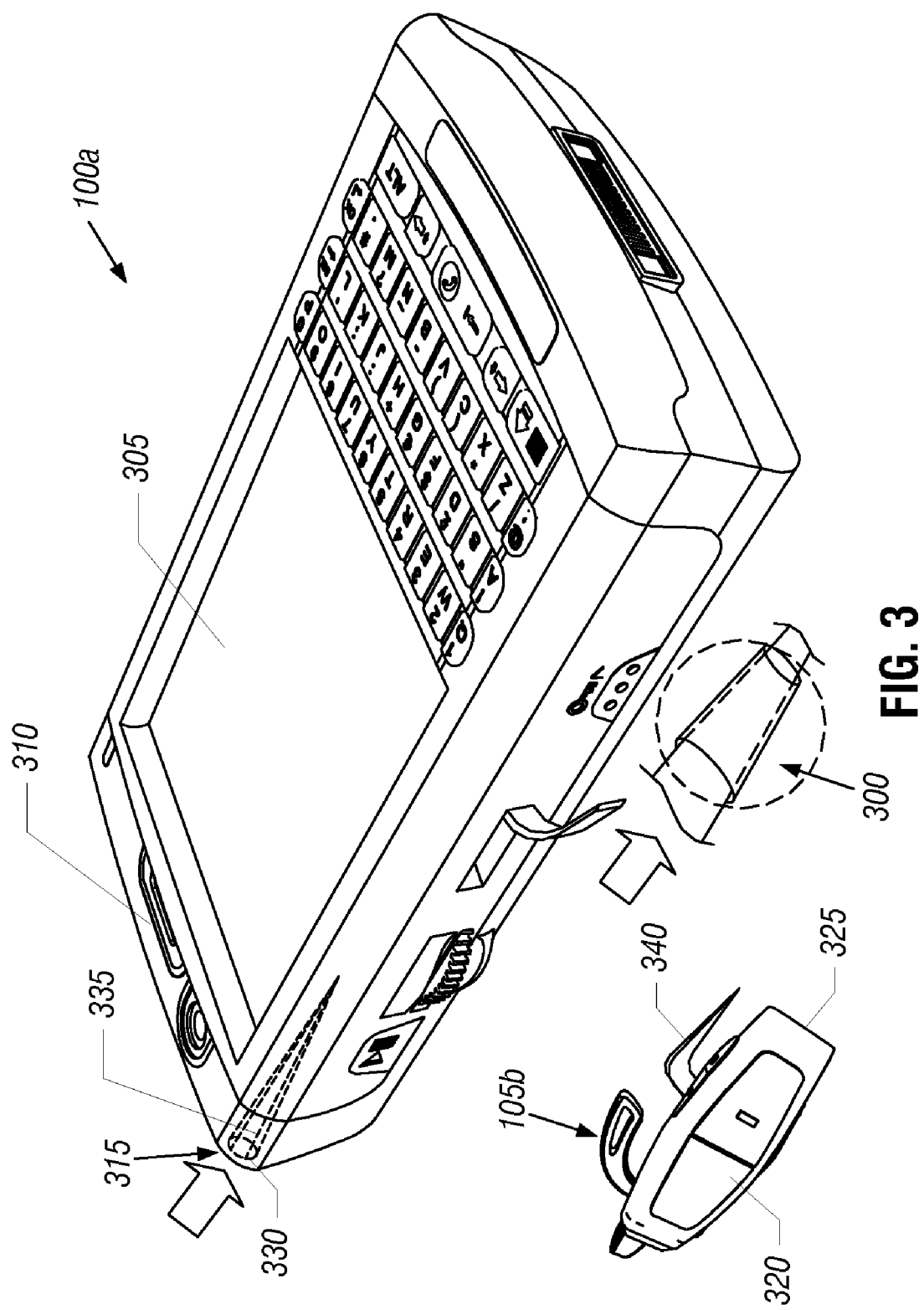
FIG. 3 illustrates a perspective view of a hand-held, portable electronic device including a retainer assembly having a cavity that forms an audiophone-retaining structure for the retainer assembly to provide a first portion in the surface of the device housing for securely holding a second portion of the attachable wireless audiophone at the hand-held, portable electronic device consistent with one embodiment of the present invention.

Turning now to FIG. 3, a hand-held, portable electronic device 100a is shown in a perspective view to include a retainer assembly 300 according to one illustrative embodiment of the present invention. The retainer assembly 300 may removably retain an attachable wireless audiophone 105b capable of coupling for communicating to the hand-held, portable electronic device 100a. The hand-held, portable electronic device 100a may comprise a device body 305 and a device housing 310 with a surface 315. By using the surface 315 of the device housing 310 and/or the device body 305, the retainer assembly 300 may removably receive the attachable wireless audiophone 105b for holding together as a pair with the hand-held, portable electronic device 100a. The attachable wireless audiophone 105b may include a headphone 320 and a microphone 325. The retainer assembly 300 having a cavity 315 that forms an audiophone-retaining structure for the retainer assembly 330 may provide a first portion 335 in the surface 315 of the device housing 310 for securely holding a second portion 340 of the attachable wireless audiophone 105b at the hand-held, portable electronic device 100a consistent with one embodiment of the present invention.

Examples of the first portion 335 include a tapered hollow structure, such as used for holding a stylus. Examples of the second portion 340 include a tapered solid structure, such as used for a stylus. For example, the shape of the tapered hollow structure and the tapered solid structure may be formed as a mating pair of two objects that may snuggly hold with each other due to a frictional force. In this way, the retainer assembly 300 may provide a locking or rigid latching structure. While the first portion 335 may be formed form a same material with which body of the hand-held, portable electronic device 100a is formed, the second portion 340 may be formed form a same material with which body of the attachable wireless audiophone 105b is formed. However, other desired forms and suitable material may be deployed to provide the first portion 335 and the second portion 340 depending upon a particular application having the benefit of the instant disclosure.

Persons of ordinary skill in the pertinent art would appreciate that for forming the retainer assembly 300 one or a combination of several material(s) may be used such as those used to fabricate the device housing 310 and/or the device body 305 of the hand-held, portable electronic device 100a. However, it is to be understood that a host of shapes and sizes may be obtained for the retainer assembly 300 based on a particular, functionality, dimensions of the shape and/or size of the hand-held, portable electronic device 100a and in accordance with dimensions of the shape and size of the attachable wireless audiophone 105b. Examples of the material that may be used to form the retainer assembly 300 include plastic, rubber, metal, and alloys. For example, polycarbonate, aluminum, aluminum alloy, magnesium may be employed for providing a lightweight and slim or ultra slim design with a compact structure to the retainer assembly 300. One example of the hand-held, portable electronic device 100a is a cellular or mobile phone that includes at least one of a digital music player, a personal digital assistant, a global positioning satellite receiver, a video player, and a pocket personal computer.

Figure 4:
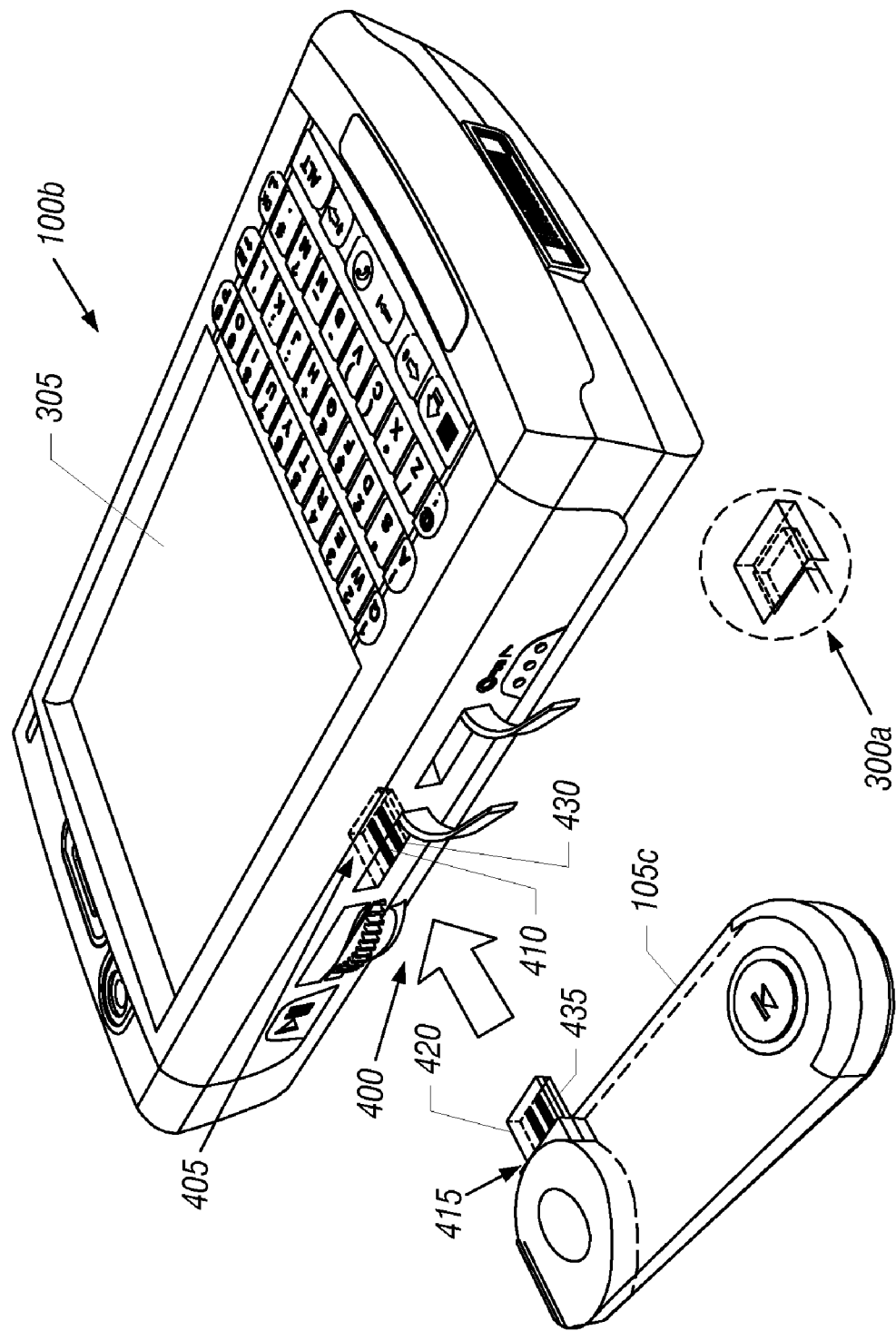
FIG. 4 illustrates a perspective view of a hand-held, portable electronic device including a retainer port having a socket that forms an audiophone-retaining structure for a retainer assembly to provide a first portion in the surface of the device housing for securely holding a second portion of the attachable wireless audiophone at the hand-held, portable electronic device consistent with one embodiment of the present invention.

Referring to FIG. 4, a hand-held, portable electronic device 100b is shown in a perspective view to include a retainer assembly 300a according to one illustrative embodiment of the present invention. In this perspective view, the hand-held, portable electronic device 100b includes a retainer port 400 having a socket 405 that forms an audiophone-retaining structure for the retainer assembly 300a. Consistent with one embodiment of the present invention, the retainer assembly 300a may provide a first portion 410 in the device housing 310 for securely holding a second portion 415 of an attachable wireless audiophone 105c at the hand-held, portable electronic device 100b. The retainer port 400 may be formed in the device housing 310 having a surface to receive a connector 420 of the attachable wireless audiophone 105c for securely holding the attachable wireless audiophone 105c at the hand-held, portable electronic device 100b.

In one embodiment, the socket 405 may receive the connector 420 of the attachable wireless audiophone 105c for in situ charging thereof at the hand-held, portable electronic device 100b. To provide in situ charging, in one embodiment, the retainer port 400 may use a power pin socket 430 to receive a power pin 435 of the connector 420 of the attachable wireless audiophone 105c. For in situ charging of the attachable wireless audiophone 105c at the hand-held, portable electronic device 100b, as one example, the attachable wireless audiophone 105c may comprise a Universal Serial Bus (USB) male connector that enables the attachable wireless audiophone 105c to receive charge at the power pin socket 430 of the hand-held, portable electronic device 100b. The attachable wireless audiophone 105c may comprise at least one of two headphones that may be folded into a single headset when the attachable wireless audiophone 105c is connected for in situ charging thereof at the hand-held, portable electronic device 100b. One example of the hand-held, portable electronic device 100b is a cellular or mobile phone that includes at least one of a digital music player, a personal digital assistant, a global positioning satellite receiver, a video player, and a pocket personal computer.

Figure 5:
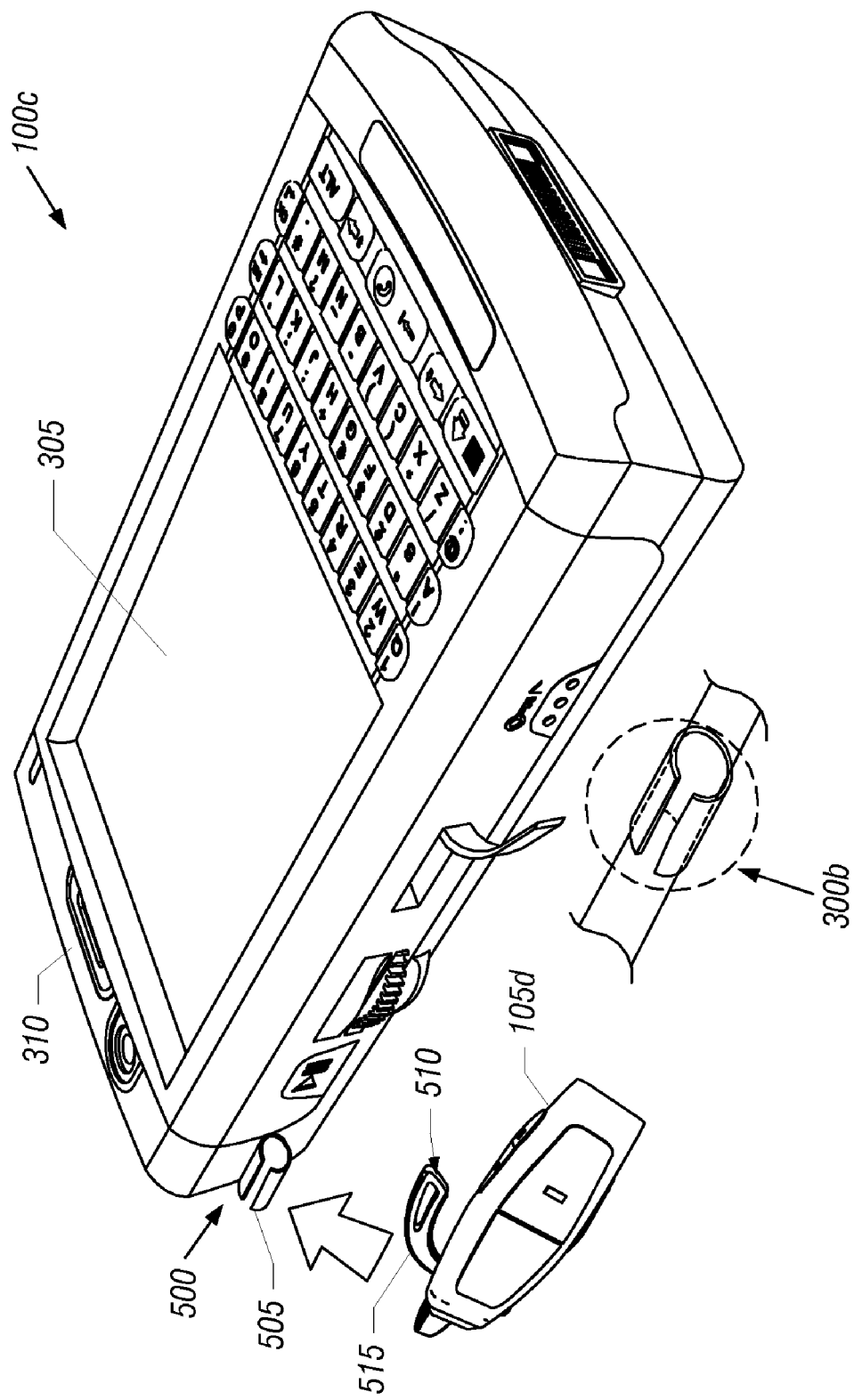
FIG. 5 illustrates a perspective view of a hand-held, portable electronic device including a retainer assembly having a latch to detachably retain the attachable wireless audiophone over the surface of the device housing consistent with one embodiment of the present invention consistent with one embodiment of the present invention.

Referring to FIG. 5, a hand-held, portable electronic device 100c is shown in a perspective view to include a retainer assembly 300b according to one illustrative embodiment of the present invention. The retainer assembly 300b may comprise a latch 500 to detachably retain an attachable wireless audiophone 105d over the surface of the device housing 310 consistent with one embodiment of the present invention. A first portion 505 of the surface of the device housing 310 may include the latch 500 formed to detachably retain at least a second portion 510 of the attachable wireless audiophone 105d with the hand-held, portable electronic device 100c.

According to one embodiment on the present invention, the latch 500 may be mounted on the device housing 310, for example, on a narrow flat side of the device body 305 of the hand-held, portable electronic device 100c. The latch 500 may be adapted to hold a flexible ear cord 515. In this way, the latch 500 may removably retain the attachable wireless audiophone 105d capable of coupling for communicating with the hand-held, portable electronic device 100c as a pair together for storage and reuse. For example, by using the surface of the device housing 310 and/or the device body 305 of the hand-held, portable electronic device 100c, the retainer assembly 300b may removably store the attachable wireless audiophone 105d along with an audio and/or video player capable of storing and playing MP3 music files and/or MPEG video files. Accordingly, the retainer assembly 300b may externally store the headphones 230 over the surface of the device housing 310 and/or internally on the device body 305 of the hand-held, portable electronic device 100c. One example of the hand-held, portable electronic device 100c is a cellular or mobile phone that includes at least one of a digital music player, a personal digital assistant, a global positioning satellite receiver, a video player, and a pocket personal computer.

Figure 6:
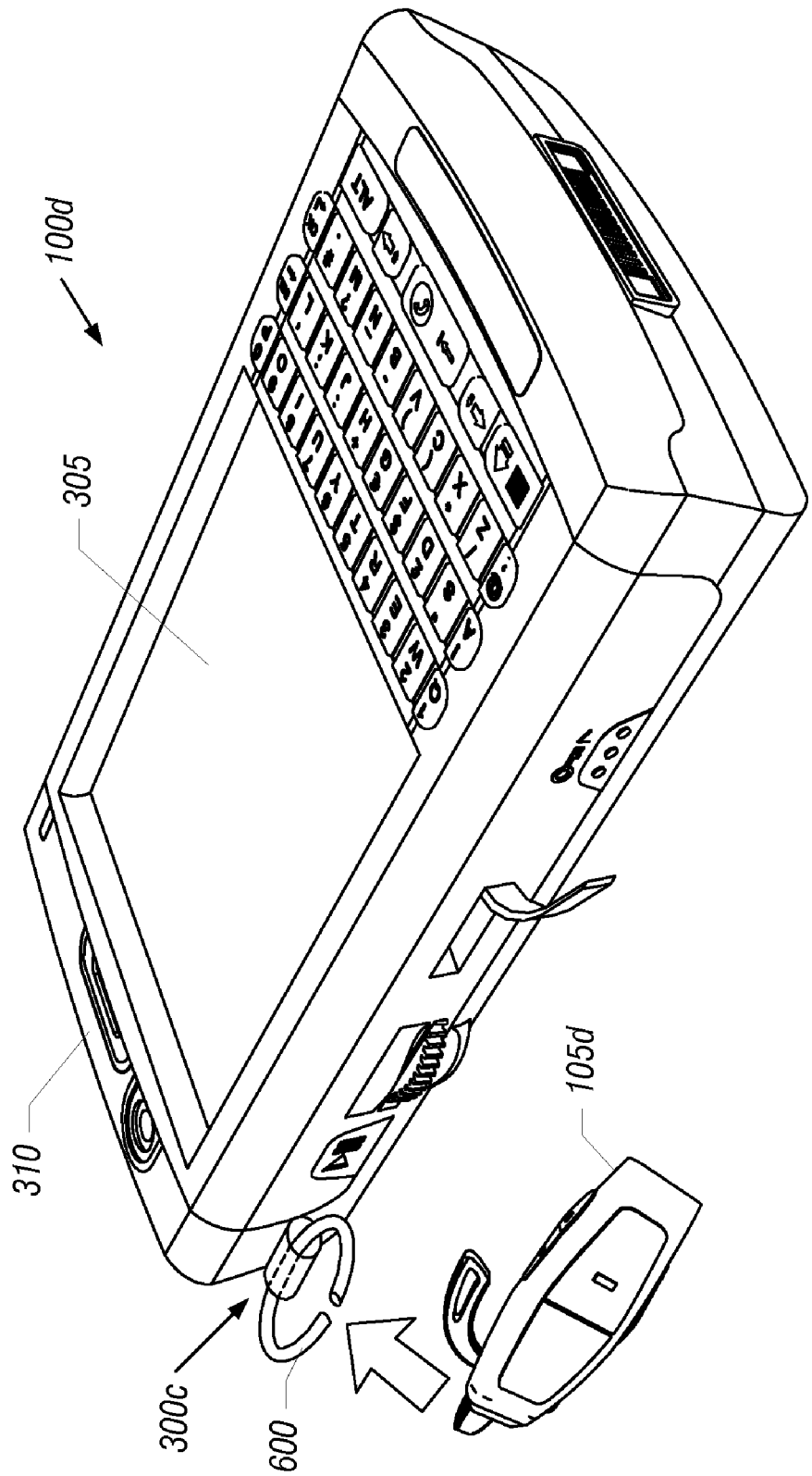
FIG. 6 illustrates a perspective view of a hand-held, portable electronic device including a retainer assembly including a flexible hook pivotably coupled to the hand-held, portable electronic device for disposing the attachable wireless audiophone over the surface of the device housing consistent with one embodiment of the present invention.

Referring to FIG. 6, a hand-held, portable electronic device 100d is shown in a perspective view to include a retainer assembly 300c according to one illustrative embodiment of the present invention. The retainer assembly 300c may include a flexible hook 600 pivotably coupled to the hand-held, portable electronic device 100d for disposing the attachable wireless audiophone 105d over the surface of the device housing 310 consistent with one embodiment of the present invention. Accordingly, when the attachable wireless audiophone 105d is being not worn by a user of the hand-held, portable electronic device 100d, the retainer assembly 300c may externally hold the attachable wireless audiophone 105d over the hand-held, portable electronic device 100d. One example of the hand-held, portable electronic device 100d is a cellular or mobile phone that includes at least one of a digital music player, a personal digital assistant, a global positioning satellite receiver, a video player, and a pocket personal computer.

Figure 7:
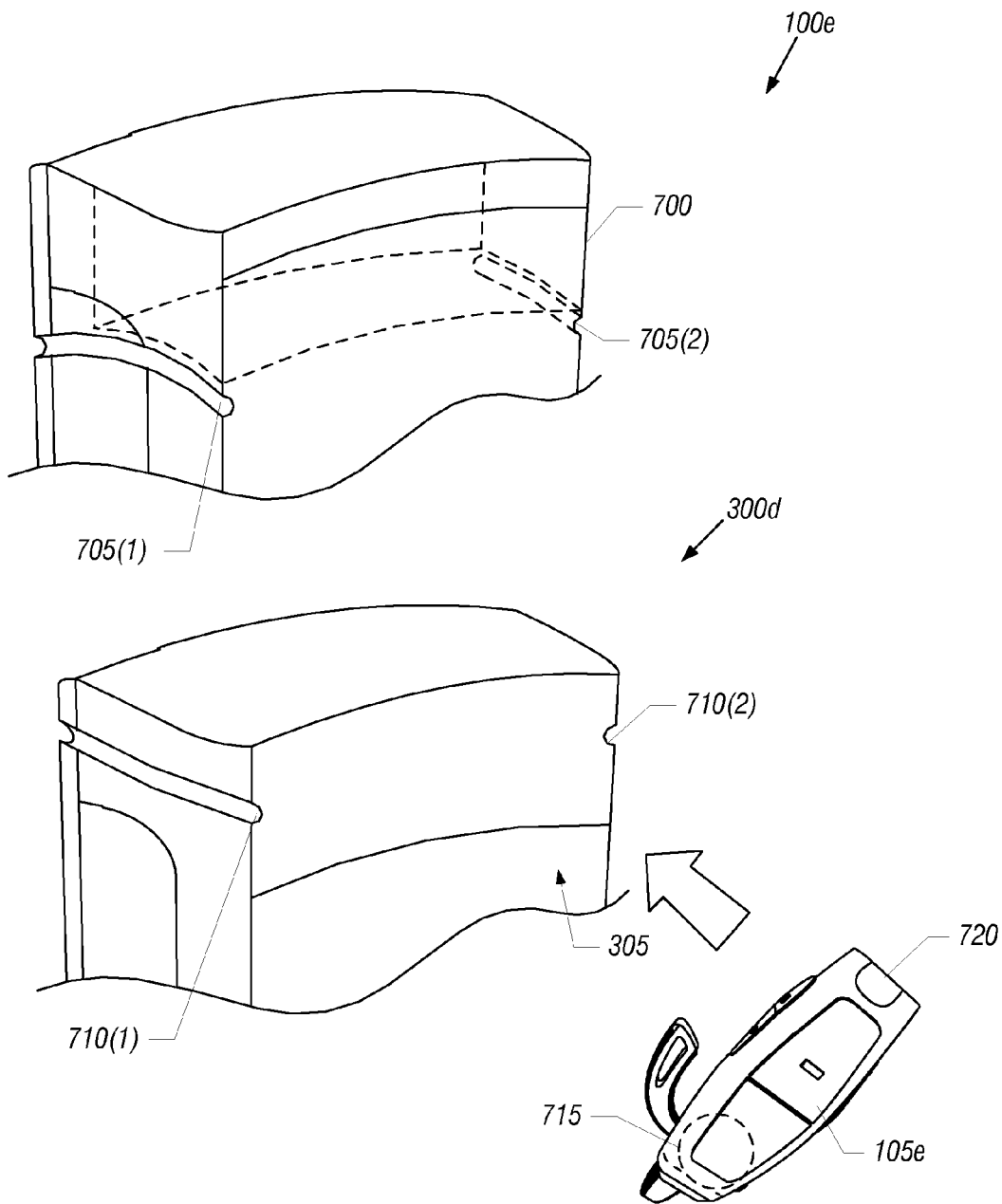
FIG. 7 illustrates a perspective view of a hand-held, portable electronic device including a retainer assembly including a box having one or more threaded notches for removably mounting on the hand-held, portable electronic device to store the attachable wireless audiophone, as shown in FIG. 1, consistent with one embodiment of the present invention.

Referring to FIG. 7, a hand-held, portable electronic device 100e is shown in a perspective view to include a retainer assembly 300d according to one illustrative embodiment of the present invention. Consistent with one embodiment of the present invention, the retainer assembly 300d may include a box 700 having one or more threaded notches 705(1,2) to fit in mating notches 710(1,2) for removably mounting on the hand-held, portable electronic device 105e to store an attachable wireless audiophone 105e. Accordingly, the retainer assembly 300d may externally hold the attachable wireless audiophone 105e over the device body 305 of the hand-held, portable electronic device 100e. In one embodiment, the retainer assembly 300d may be an attachable sleeve configured to latchably mount on the hand-held, portable electronic device 100e.

The box 700 may be operable for mounting on or as the device housing 310 to store the attachable wireless audiophone 105e housed therein with the hand-held, portable electronic device 100e when the attachable wireless audiophone 105e is being not worn by a user of the hand-held, portable electronic device 100e. The attachable wireless audiophone 105e may be a handsfree headset that comprises at least one flexible earphone 715 and a microphone 720. One example of the hand-held, portable electronic device 100e is a cellular or mobile phone that includes at least one of a digital music player, a personal digital assistant, a global positioning satellite receiver, a video player, and a pocket personal computer.

Figure 8:
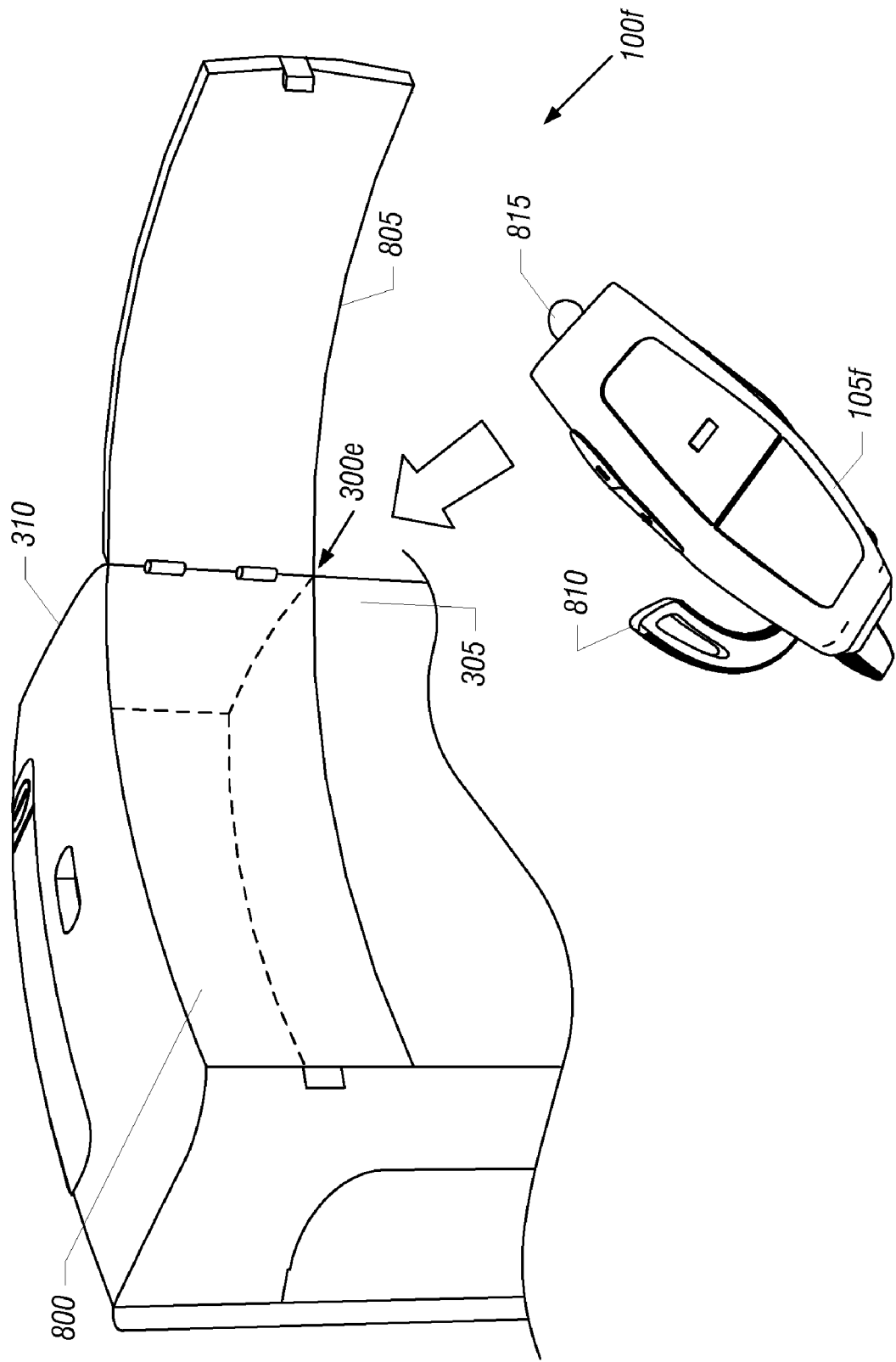
FIG. 8 illustrates a perspective view of a hand-held, portable electronic device including a retainer assembly including a receptacle having a lid coupled to hand-held, portable electronic device for pivotably closing the receptacle to store the attachable wireless audiophone, as shown in FIG. 1, consistent with one embodiment of the present invention.

Referring to FIG. 8, a hand-held, portable electronic device 100f is shown in a perspective view to include a retainer assembly 300e according to one illustrative embodiment of the present invention. The retainer assembly 300e may include a receptacle 800 having a lid 805 coupled to hand-held, portable electronic device 100f for pivotably closing the receptacle 800 to store an attachable wireless audiophone 105f consistent with one embodiment of the present invention. The receptacle 800 may be operable for keeping in the attachable wireless audiophone 105f for storage by housing it therein with the device body 305 of the hand-held, portable electronic device 100f. That is, the receptacle 800 may hold the attachable wireless audiophone 105f when it is not being worn by a user of the hand-held, portable electronic device 100f.

The attachable wireless audiophone 105f may be a handsfree headset that comprises a bendable earphone 810 and a flexible microphone 815. One example of the hand-held, portable electronic device 100f is a cellular or mobile phone that includes at least one of a digital music player, a personal digital assistant, a global positioning satellite receiver, a video player, and a pocket personal computer.

Figure 9:
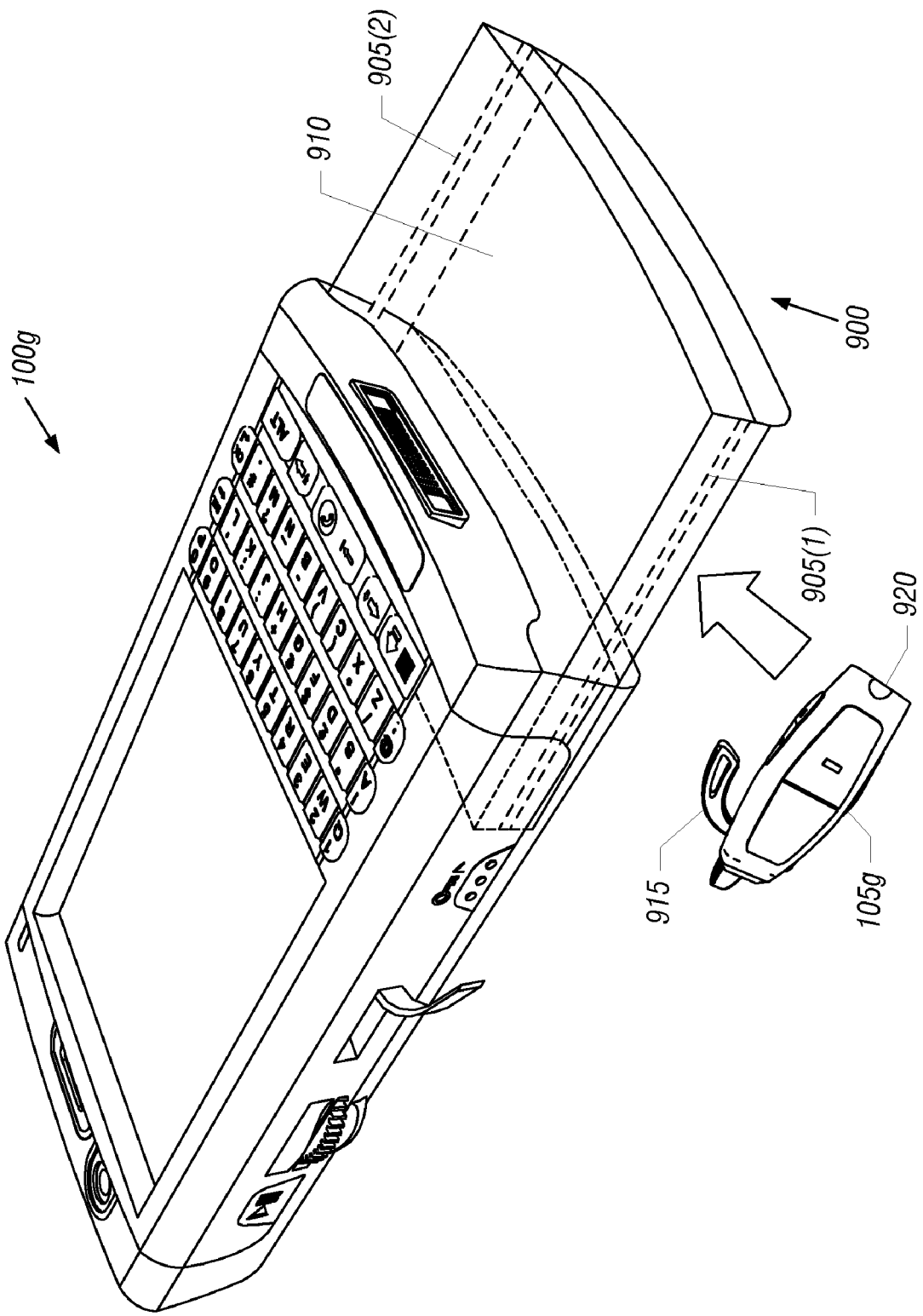
FIG. 9 illustrates a perspective view of a hand-held, portable electronic device including a retainer assembly including a retractable holder having one or more rails operable for mounting in the device housing and having a cup on a distil end to retain the attachable wireless audiophone, as shown in FIG. 1, consistent with one embodiment of the present invention.

Referring to FIG. 9, a hand-held, portable electronic device 100g is shown in a perspective view to include a retainer assembly 300f according to one illustrative embodiment of the present invention. The retainer assembly 300f may include a retractable holder 900 having one or more rails 905(1,2) operable for mounting in the device housing 310. The retractable holder 900 having a cup 910 on a distil end may retain an attachable wireless audiophone 105g consistent with one embodiment of the present invention.

The attachable wireless audiophone 105g may be a handsfree headset that comprises at least one pivotally movable ear grip 915 and a flexible microphone 920. One example of the hand-held, portable electronic device 100g is a cellular or mobile phone that includes at least one of a digital music player, a personal digital assistant, a global positioning satellite receiver, a video player, and a pocket personal computer. The attachable wireless audiophone 105g may be a handsfree headset that comprises at least one insertable ear plug. The attachable wireless audiophone 105g may be a handsfree headset that comprises at least one arm that latches externally to ear.

Figure 10:
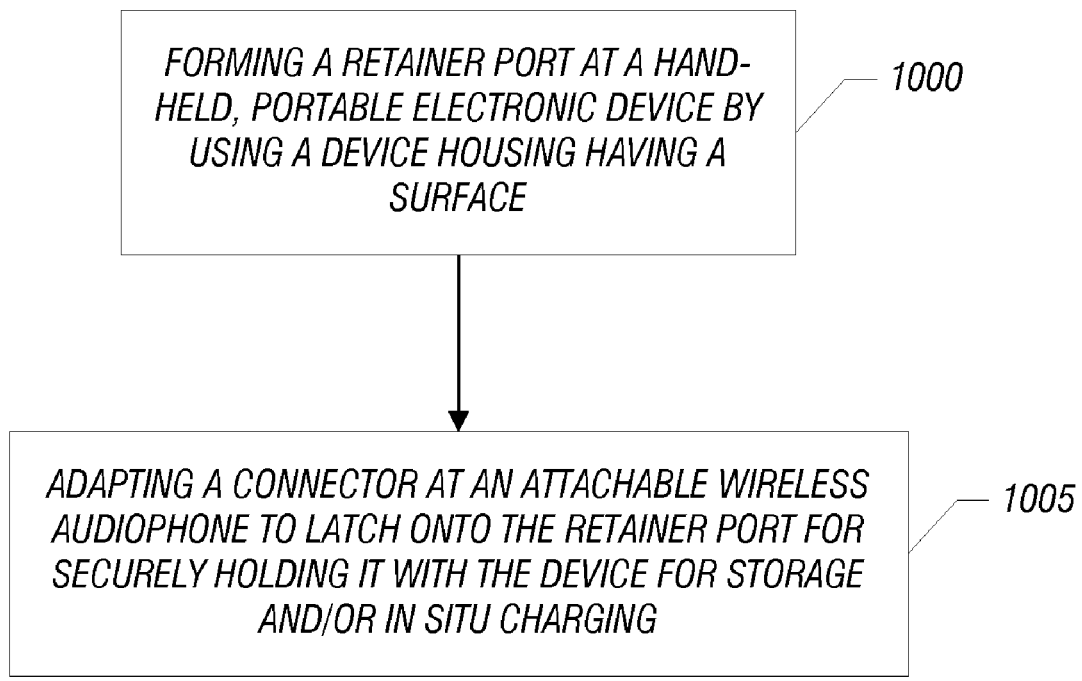
FIG. 10 illustrates a stylized representation for implementing a method for providing a retainer port to retain an attachable wireless audiophone including at least one speaker and a microphone on a hand-held, portable electronic device shown in FIG. 3 consistent with one illustrative embodiment of the present invention.

Turning now to FIG. 10, a stylized representation for implementing a method for providing the retainer port 400, as shown in FIG. 4, is illustrated to retain the attachable wireless audiophone 105c including at least one speaker and a microphone on the hand-held, portable electronic device 100b shown in FIG. 4 consistent with one illustrative embodiment of the present invention.

At block 1000, by using the device housing 310 having a surface of the hand-held, portable electronic device 100b the retainer port 400 may be formed. That is, at the hand-held, portable electronic device 100b, the retainer port 400 may be configured for receiving the attachable wireless audiophone 105c. At block 1005, the connector 415 at the attachable wireless audiophone 105c may be adapted to latch on to the retainer port 400 that may receive the connector 415 of the attachable wireless audiophone 105c for securely holding it at the hand-held, portable electronic device 100b. In this way, by using the retainer assembly 300a, the hand-held, portable electronic device 100b may removably receive the attachable wireless audiophone 105c for retaining it over the device body 310. According to various embodiments of the retainer assembly 300a including the shown structures 300a-300e may be formed, molded, manufactured, assembled or fabricated, as illustrated in FIGS. 3 to 8. For example, the retainer assembly 300a-300e structures may be obtained by using one or more material(s) in a combination as described above based on a specific application having desired dimensions.

Portions of the present invention and corresponding detailed description are presented in terms of physical and symbolic representations of components. These descriptions and representations are the ones by which those of ordinary skill in the art effectively convey the substance of their work to others of ordinary skill in the art. It should be borne in mind, however, that all of these and similar components are to be associated with the appropriate physical quantities and are merely convenient labels applied to these structures.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A hand-held, portable electronic device for use with an attachable wireless audiophone including at least one of a speaker and a microphone and a metal connector, the hand-held, portable electronic device comprising:
   a device body;
   a device housing that encloses the device body, said device housing having an exterior surface; and
   a retainer port including an electrical socket that defines an audiophone retaining structure formed in said exterior surface of said device housing, said audiophone retaining structure is configured to receive said metal connector of said attachable wireless audiophone for storing said attachable wireless audiophone substantially external to said device body of said hand-held, portable electronic device by keeping said attachable wireless audiophone substantially outside of said device housing,
   wherein said hand-held, portable electronic device includes a first transceiver adapted to communicate with said attachable wireless audiophone over a wireless communication link, said attachable wireless audiophone including a second transceiver adapted to communicate with said hand-held, portable electronic device using said wireless communication link, wherein said electrical socket including:
   a cavity for retaining said attachable wireless audiophone at said hand-held, portable electronic device by inserting said metal connector of said attachable wireless audiophone within said cavity, wherein said retainer port to receive said metal connector of said attachable wireless audiophone which provides charge only for in situ charging thereof at said hand-held, portable electronic device, wherein said attachable wireless audiophone is stored for reuse when physically connected to said hand-held, portable electronic device,
   wherein said audiophone retaining structure is configured to accept a male connector which extends away from said attachable wireless audiophone.

2. The hand-held, portable electronic device, as set forth in claim 1, wherein said attachable wireless audiophone is a handsfree headset that comprises at least one flexible earphone and said hand-held, portable electronic device is a cell phone that includes at least one of a digital music player, a personal digital assistant, a global positioning satellite receiver, a video player, and a pocket personal computer.

3. The hand-held, portable electronic device, as set forth in claim 2, wherein said handsfree headset comprises a bendable earphone and said hand-held, portable electronic device is a cell phone that includes at least one of a digital music player, a personal digital assistant, a global positioning satellite receiver, a video player, and a pocket personal computer.

4. The hand-held, portable electronic device, as set forth in claim 2 wherein said handsfree headset comprises at least one pivotally movable ear grip and said hand-held, portable electronic device is a cell phone that includes at least one of a digital music player, a personal digital assistant, a global positioning satellite receiver, a video player, and a pocket personal computer.

5. The hand-held, portable electronic device, as set forth in claim 2, wherein said handsfree headset comprises at least one insertable ear plug and said hand-held, portable electronic device is a cell phone that includes at least one of a digital music player, a personal digital assistant, a global positioning satellite receiver, a video player, and a pocket personal computer.

6. The hand-held, portable electronic device, as set forth in claim 2, wherein said handsfree headset comprises at least one arm that latches externally to ear and said hand-held, portable electronic device is a cell phone that includes at least one of a digital music player, a personal digital assistant, a global positioning satellite receiver, a video player, and a pocket personal computer.

7. The hand-held, portable electronic device, as set forth in claim 1, wherein said attachable wireless audiophone is a headset configured for consumer wearing by a wireless user, said second transceiver of said attachable wireless audiophone is adapted to communicate with said first transceiver of said hand-held, portable electronic device using a Bluetooth protocol for a short-range wireless communication associated with the wireless user, said hand-held, portable electronic device is a Bluetooth-enabled cell phone.

8. A hand-held, portable electronic device for use with an attachable wireless audiophone including at least one of a speaker and a microphone and a metal connector, the hand-held, portable electronic device comprising:
  a device body;
  a device housing that encloses the device body, said device housing having an exterior surface; and
  a retainer port including an electrical socket that defines an audiophone retaining structure formed in said exterior surface of said device housing, said audiophone retaining structure is configured to receive said metal connector of said attachable wireless audiophone for storing said attachable wireless audiophone substantially external to said device body of said hand-held, portable electronic device by keeping said attachable wireless audiophone substantially outside of said device housing,
  wherein said hand-held, portable electronic device includes a first transceiver adapted to communicate with said attachable wireless audiophone over a wireless communication link, said attachable wireless audiophone including a second transceiver adapted to communicate with said hand-held, portable electronic device using said wireless communication link, wherein said electrical socket including:
  a cavity for retaining said attachable wireless audiophone at said hand-held, portable electronic device by inserting said metal connector of said attachable wireless audiophone within said cavity, wherein said retainer port to receive said metal connector of said attachable wireless audiophone which provides charge only for in situ charging thereof at said hand-held, portable electronic device, wherein said attachable wireless audiophone is stored for reuse when physically connected to said hand-held, portable electronic device,
  wherein said electrical socket is a power pin socket to receive a power pin of said connector of said attachable wireless audiophone for in situ charging thereof at said hand-held, portable electronic device,
  wherein said attachable wireless audiophone comprises a Universal Serial Bus (USB) male connector that enables said attachable wireless audiophone to receive charge at said power pin socket of said hand-held, portable electronic device.

9. The hand-held, portable electronic device, as set forth in claim 1, further comprising:
  a device battery; and
  a charge circuitry for charging said device battery and a battery of said attachable wireless audiophone.

10. The hand-held, portable electronic device, as set forth in claim 1, wherein said audiophone retaining structure is configured to mate with said metal connector such that frictional forces developed by the contact are sufficient to maintain said metal connector in place after detachably latching said attachable wireless audiophone.

11. A hand-held, portable electronic device for use with a given wireless pairing headset, configured for consumer wearing by a wireless user, including a first electrical connector and a battery, the hand-held, portable electronic device comprising:
  a device body; and
  a retainer including a second electrical connector, said retainer defines a headset retaining structure formed on said device body for storing said wireless pairing headset substantially external to said device body of said hand-held, portable electronic device, said second electrical connector is configured to mate with said first electrical connector of said wireless pairing headset,
  wherein said hand-held, portable electronic device includes a first transceiver adapted to communicate with said wireless pairing headset over a wireless communication link on a personal area network using a device-to-device short range radio frequency transmission through an air interface medium, said wireless pairing headset including a second transceiver adapted to communicate with said hand-held, portable electronic device using said wireless communication link on the personal area network using the device-to-device short range radio frequency transmission through the air interface medium,
  wherein said retainer to receive said first electrical connector of said wireless pairing headset which provides charge for in situ charging thereof at said hand-held, portable electronic device, wherein said wireless pairing headset is stored for reuse when physically connected to said hand-held, portable electronic device,
  wherein said first electrical connector is a Universal Serial Bus (USB) connector such that the second electrical connector of the retainer is configured to accept the USB connector of the wireless pairing headset.

12. The hand-held, portable electronic device, as set forth in claim 11, wherein said wireless pairing headset is a handsfree attachable earphone including at least one of a speaker and a microphone and said hand-held, portable electronic device is a cell phone that includes at least one of a digital music player, a personal digital assistant, a global positioning satellite receiver, a video player, and a pocket personal computer.

13. The hand-held, portable electronic device, as set forth in claim 11, wherein said second transceiver of said wireless pairing headset is adapted to communicate with said first transceiver of said hand-held, portable electronic device using a Bluetooth protocol for a short-range wireless communication associated with the wireless user, said hand-held, portable electronic device is a Bluetooth-enabled cell phone.

14. The hand-held, portable electronic device, as set forth in claim 11, wherein said second electrical connector is a power pin socket to receive a power pin of said first electrical connector of said wireless pairing headset for in situ charging thereof at said hand-held, portable electronic device.

15. The hand-held, portable electronic device, as set forth in claim 14, wherein said first electrical connector enables said wireless pairing headset to receive charge at said power pin socket of said hand-held, portable electronic device.

16. The hand-held, portable electronic device, as set forth in claim 11, wherein said headset retaining structure is configured to accept said USB connector which extends away from said wireless pairing headset.

17. The hand-held, portable electronic device, as set forth in claim 11, further comprising:
   a device battery; and
   a charge circuitry for charging said device battery and said battery of said attachable wireless audiophone.

18. The hand-held, portable electronic device, as set forth in claim 11,
   wherein said headset retaining structure is configured to mate with said first electrical connector such that frictional forces developed by the contact are sufficient to maintain said first electrical connector in place after detachably latching to said wireless pairing headset.

* * * * *